March 10, 1970     R. BUSER ET AL     3,500,078
ELECTRICAL PULSE GENERATORS
Filed Oct. 3, 1967     2 Sheets-Sheet 1
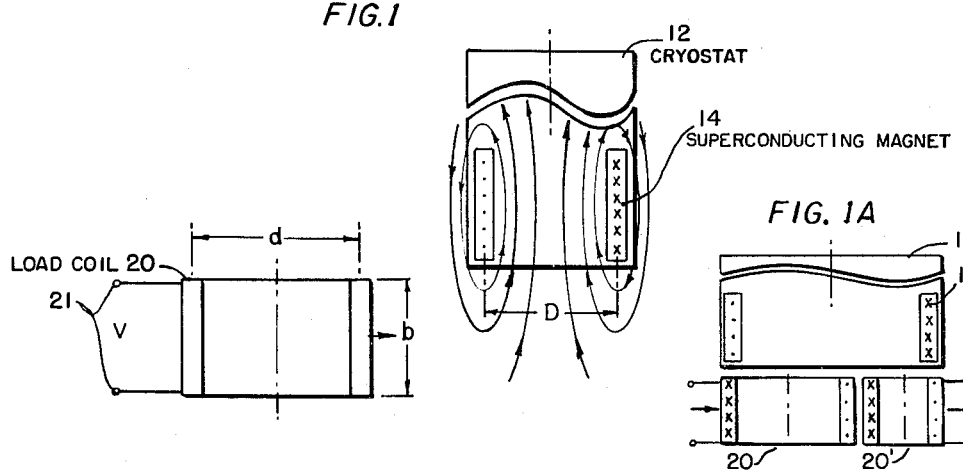
FIG. 1
FIG. 1A
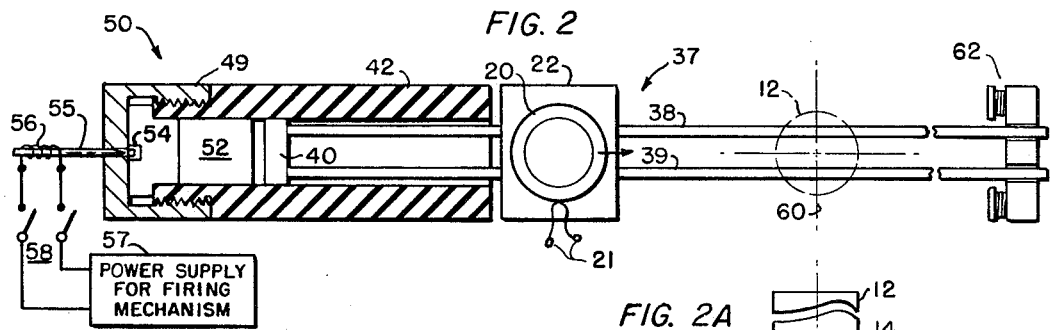
FIG. 2
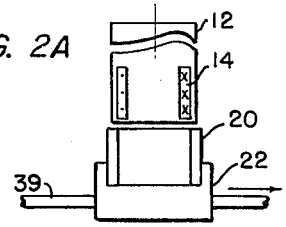
FIG. 2A
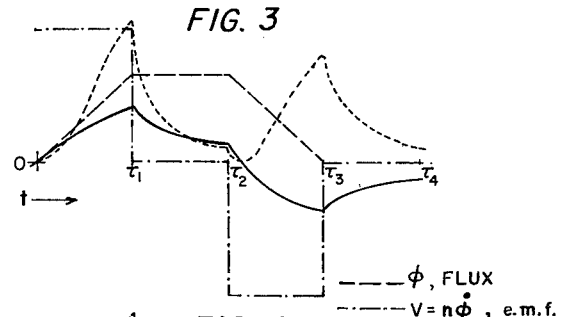
FIG. 3
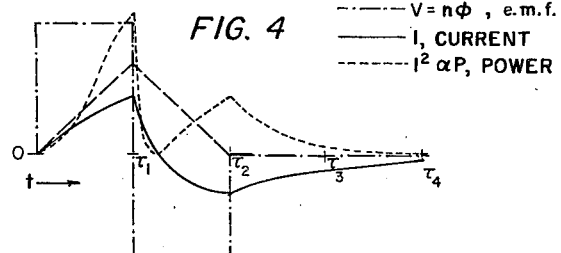
FIG. 4
— $\phi$, FLUX
—·— $V = n\dot{\phi}$, e.m.f.
——— I, CURRENT
- - - - $I^2 \alpha P$, POWER
INVENTORS,
RUDOLF BUSER
GERHART K. GAULE'
RAYMOND L. ROSS.
BY Daniel A. Sharp, Agent
Harry M. Saragovitz,
Edward J. Kelly, Herbert Berl
ATTORNEYS.

March 10, 1970    R. BUSER ET AL    3,500,078

ELECTRICAL PULSE GENERATORS

Filed Oct. 3, 1967      2 Sheets-Sheet 2

INVENTORS,
RUDOLF BUSER,
GERHART K. GAULE,
RAYMOND L. ROSS.

BY Daniel D. Sharp, Agent
Harry M. Saragovitz,
Edward J. Kelly &
Herbert Berl

ATTORNEYS.

United States Patent Office 3,500,078
Patented Mar. 10, 1970

3,500,078
ELECTRICAL PULSE GENERATORS
Rudolf Buser, Wall, Gerhart K. Gaule, Elberon, and Raymond L. Ross, Oakhurst, N.J., assignors to the United States of America as represented by the Secretary of the Army
Filed Oct. 3, 1967, Ser. No. 672,658
Int. Cl. H02k 35/06
U.S. Cl. 310—13      7 Claims

ABSTRACT OF THE DISCLOSURE

A generator of pulses of high energy level and current wherein a strong magnetic field emanating from a superconducting magnet is interrupted by explosively driving a coil or other electrically conductive member past said magnetic field. One or more load coils in which the high energy pulses are to appear may be driven across the superconductor magnetic field, or a flux displacer can be driven so as to alter suddenly the magnetic field flux from the superconducting magnet passing through a stationary load coil or coils.

BACKGROUND OF THE INVENTION

Many present-day applications require electrical energy in the form of short, steep pulses of high current at high voltage. Furthermore, it is often required that these high energy pulse sources be lightweight and compact and capable of low loss operation when in a standby mode. To fulfill these requirements, conventional designs use a primary power source, such as a battery or generator, whose steady state output needs to be only moderate since it is accumulated in a capacitor. The pulse energy then is obtained through a rapid discharge of said capacitor. Although it has been known that inductors can store energy in a similar fashion, large scale inductive energy storage could not become practical until the arrival of hard superconductors which allow maintenance of very high current and magnetic field densities with virtually no less during virtually no loss during periods when no energy is delivered. In the case of capacitors, the charging process must be halted before detrimental effects set in. While the capacitor voltage is limited by the destructive electrical breakdown field of the dielectric, a superconducting inductor current is limited by the critical current density of the superconducting tape used for the winding; exceeding the critical current, however, leads only to a loss of flux and not to permanent damage of the superconductor. Since the critical current density of a hard superconductor is very high (of the order of $10^4$ to $10^5$ amperes per square centimeter, depending upon the local field), the superconducting solenoid with a winding thickness of only about 5 centimeters can generate fields up to 100,000 gauss. These high fields lead to a very high density of magnetic energy in and around the superconducting magnet—much higher than the analogous value for a capacitor. The basic volume of an inductive storage system is much smaller, therefore, therefore, than that of an equivalent capacitance system. Furthermore, the mass of a capacitor increases in proportion to its volume, whereas the mass of a well designed superconducting solenoid increases only with the ⅔ power of its volume. Consequently, the larger the energy to be stored, the greater the advantage of the inductor system, from a mass standpoint.

The use of conventional inductors as energy sources, while satisfactory for low power applications, is totally unsatisfactory when large amounts of energy must be stored and delivered to a useful load, because of the constant large ohmic loss of a "charged" conventional inductor. Furthermore, when high energy pulses of short duration are required, a high, but concentrated, magnetic flux is necessary; only such a flux can be trespassed or interrupted in a transit time short enough to yield a short, high energy electrical pulse. A conventional magnet would not allow the required high concentration of magnetic flux. Therefore, to obtain a short enough transit time, the velocity of the moving conductor passing such a conventional magnet would have to be much higher than present practical drive mechanisms permit.

SUMMARY OF THE INVENTION

The generator of pulses of high energy level and high current includes a superconducting magnet for producing a very strong magnetic field and an explosive drive for rapidly interrupting the flux from the superconducting magnet which threads through a load coil or coils. The superconducting magnet, once energixed, maintains its magnetic field indefinitely and no power supply is required except to initiate the explosive discharge which swiftly drives an electrical conductor across the strong magnetic field emanating from the superconducting magnet. Thhe electrical conductor may be either the load coil(s) or a flux displacer which is driven between the superconducting magnet and a stationary load coil(s) adjacent thereto. In order to achieve greater coupling between the superconducting magnet and the load coil, the flux displacer may be arranged to slide over the load coil so that only a portion thereof passes between the superconducting magnet and the load coil.

BRIEF DESCRIPTION OF THE DRAWINGS

FIG. 1 is a schematic view of a first embodiment of the invention wherein a load coil is caused to move past the flux emanating from a superconducting magnet;

FIG. 1A is a schematic view similar to FIG. 1 except that a second load coil is moved past the superconducting magnet;

FIGS. 2 and 2A, taken together, illustrate a device forming a first embodiment of the invention;

FIGS. 3 and 4 show the variations of the external flux through the moving coil, the open circuit voltage, and the current and the power delivered into a matched load for two coils with different diameters, the arrangement of magnet and moving coil being as in FIG. 1;

DETAILED DESCRIPTION OF THE PREFERRED EMBODIMENTS

Figure 8:
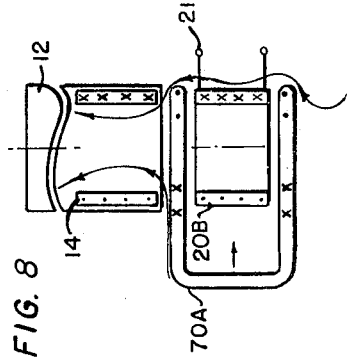
FIG. 8 is a schematic view of a modification of the second embodiment of the invention wherein the flux displacer is so designed that it slides over the load coil, thereby permitting placement of the load coil closer to the superconducting magnet coil.

The principles of operation of the first embodiment of the invention are shown in FIGS. 1, 2, 2A, 3 and 4. Referring to FIG. 1, a cryostat 12 is shown; as is well known, the cryostat comprises a coil 14 of superconducting material, surrounded by a cooling fluid which has a temperature in the vicinity of absolute zero. The direction of current flowing through coil 14 is indicated by the dots and crosses in FIG. 1 and the magnetic flux surrounding the coil is indicated in FIG. 1, with the direction of the flux indicated by the arrows. The cooling fluid may be liquid helium, which may flow into and out of the cryostat 12 by fluid conduits, not shown in FIGS. 1 and 2. The superconducting magnet 14 may be energized by passing a current through the coil by way of leads, not shown in FIGS. 1 and 2, after introduction of the cooling fluid into the cryostat.

The simplest method for converting mechanical into electrical energy is by moving the load coil 20 across the magnetic field emanating from the superconducting magnet 14. As will be shown more clearly in FIGS. 2 and 2A, the load coil 20 is driven swiftly across the strong magnetic field from the superconducting magnet 14. As the load coil 20 enters the high field region of the superconducting magnet, an electromotive force V is impressed on the load coil 20 which is given by the expression $$V = n \frac{d\phi}{dt}$$

where $\phi$ is the external flux emanating from the coil 14 and $n$ is the number of turns on the load coil.

FIGS. 3 and 4 are approximate theoretical curves of external flux, $\phi$ (flux emanating from the superconducting magnet 14), voltage V, current I and current squared ($I^2$) which is proportional to the power P supplied into a matched load. The curves of FIG. 3 are for a relatively large moving coil 20 where the diameter $d$ of the load coil 20 is equal to twice the diameter D of the superconducting coil 14. In this case, it will be noted that the flux increases roughly linearly as the load coil enters the magnetic field of the superconducting magnet 14. The duration $\tau$ of this flux increase is equal to $D/v$ where $v$ is the velocity of the moving coil 20. The value of $\tau$ may be of the order of 1 millisecond. Owing to the fact that the diameter $d$ of the load coil 20 is twice that of the coil 14, a period of constant flux, also of duration $\tau$, follows while the load coil is juxtaposed into the superconducting coil 14. Subsequently, as the load coil 20 moves past the coil 14, the external flux decreases linearly during a time interval $\tau$. The curves of FIG. 4 are for the case of a moving coil 20 whose diameter $d$ is equal to the diameter D of the superconducting magnet coil 14. In this case, it will be noted that the flux increases as the coil 20 enters the field of the superconducting magnet until the coil 20 is aligned with coil 14, after which the coil 20 moves away past the field of the superconducting magnet 14 and the flux induced in coil 20 starts to diminish linearly.

In a practical design, one would select a ratio $D/d$ lying between the ones portrayed in FIGS. 3 and 4. The best compromise will be determined by the power requirements of the user of the energy source. The design represented by FIG. 3 yields two pulses of duration of substantially $\tau$ separated by a duration of about $2\tau$. In the design represented in FIG. 4 the sudden reversal of the voltage reduces the energy output of the pulse, particularly that of the second pulse. For an intermediate coil, both pulses would be brought closer together without appreciable attenuation.

In some cases, a plurality of load coils may be desired, as for example, when pulses of different character or time sequence are to be obtained. FIG. 1A illustrates one such case wherein a second load coil 20′ is moved past the superconducting magnet 14 as well as load coil 20.

Referring now to FIGS. 2 and 2A, a load coil 20 is shown mounted on, or carried by, a platform 22; the platform 22 is attached to a piston assembly 37 which can comprise two elongated rods 38 and 39 extending from piston 40. The piston 40 is disposed within the barrel 42 of the breach-loaded gun 50. The gun assembly 50 is loaded by unscrewing the breach 49 which threadably engages the barrel 42, and by inserting shell 52 which contains an explosive charge and a percussion cap 54. Upon insertion of the shell 52, the breach 49 is screwed onto the barrel 42. The breach includes a firing pin 55 surrounded by an actuating coil 56 which, in turn, can be energized from a power supply 57 upon closing switch 58. Upon energization of the coil 56, the firing pin 55 strikes the percussion cap and an explosion is produced within the gun 50. This explosion forces the piston 40 and the platform 22 to move to the right in FIG. 2, and carries the load coil 20 past the superconducting magnet 14, as shown in FIG. 2A. In other words, the movable load coil 20 is driven from the position shown in FIG. 2 in solid lines to the position centered above line 60 in FIGS. 2 and 2A. The position of the cryostat 12 containing superconducting coil 14 is shown in the broken line in FIG. 2. A brake 62 is provided to brake the movement of the piston assembly 37 and to permit recoil of the assembly after each firing pulse from source 57. The time of transit ($3\tau$ in the case of FIG. 3 and $2\tau$ in the case of FIG. 4) of the moving coil through the region of high magnetic field from the superconducting coil 14 is dependent, in part, upon the amount of charge in the shell 52 and should be small compared to the time constant of load coil 20—given by the ratio of the inductance of this coil to its resistance—in order to permit reasonable energy transfer to the load. Also, as shown above, the duration of each of the two power pulses is slightly less than $1\tau$, and the transit time, therefore, cannot exceed the required pulse length by more than a factor of three or four. Since the load coil 20 is being moved along the path indicated in FIG. 2, the leads 21A and 21B to the coil must be flexible and of sufficient length to allow for such movement without causing mechanical breaking of the leads. In order to be useful as a power generator, moving coil 20 must have a low source impedance. A reduction of inductance of the load coil can be achieved, to some degrees, without reducing the voltage, by increasing the length $b$ (and thus the volume) of the coil, while the diameter $d$ remains constant. This, of course, increases the power output.

Figure 7:
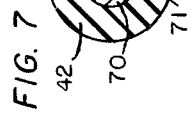
FIG. 7 is an end view of the gun assembly of the device shown in FIG. 6, also showing the flux displacer.
Figure 5A:
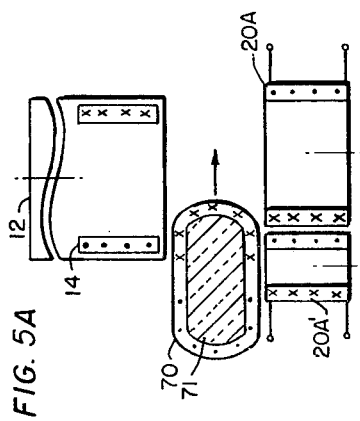
FIG. 5A is a schematic view similar to FIG. 5 except that two load coils are used.
Figure 6:
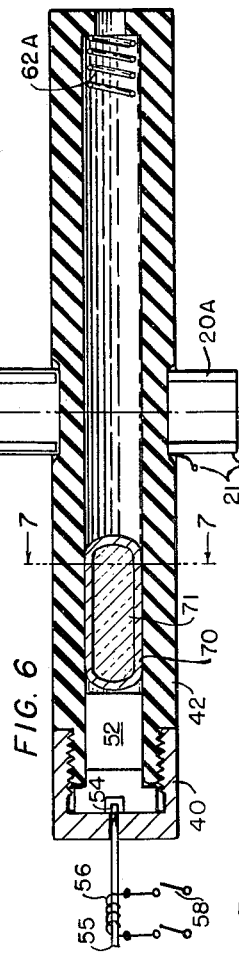
FIG. 6 is a pictorial view of a second embodiment of the invention using the flux displacer passing between the superconducting magnet coil and the load coil.
Figure 5:
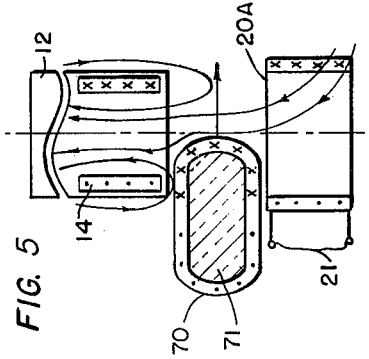
FIG. 5 is a schematic view showing a second embodiment of the invention wherein a flux displacer is used in order that the load coil may be stationary.

The transfer of large current pulses from the fast moving load coil to a stationary load sometimes proves mechanically awkward. Another system for deriving pulses of high energy and high current is shown in FIGS. 5 to 7 wherein the large magnetic flux emanating from the superconducting magnet 14 is rapidly deflected by the passage of a flux displacer 70 which is driven at high velocity between the superconducting magnet 14 and a stationary load coil 20A. The flux displacer 70 may be considered as a "shorted load coil" carrying a current as shown by the dots and crosses in FIG. 5. FIG. 5A illustrates an example of a plurality of load coils 20A and 20A′ which are disposed within the magnetic field emanating from the superconducting magnet 14. For example, coil 20A′ may be used for generating a high voltage, low current pulse, followed by the pulsating energy of low voltage, and high current from the load coil 20A. The heavy induced current in this "shorted coil" 70 generates a magnetic flux nearly equal to the flux emanating from the superconducting magnet, but in opposite direction, provided the transit time is shorter than the time constant of the "shorted coil" 70. As a result, the total flux penetrating the stationary load coil 20A is practically cancelled during the transit.

The rapid change of the external flux through the load coil 20A generates pulses of electrical energy in a manner analogous to the moving coil concept described above. In the flux displacer concept, energy is available from stationary leads 21 which connect the load to stationary load coil 20A. This contrasts with the previous concept where the load coil is moving and the leads thereto also have to be designed in view of this movement.

An apparatus for achieving motion of the flux displacer 70 between the two coils 14 and 20A is shown in FIGS. 6 and 7. When an actuating pulse is applied to the firing coil 56 from the firing power supply, the firing pin 55 strikes the percussion cap of shell 52 and the explosive discharge forces the flux displacer 70 to move along the barrel 42 of the gun 50. The barrel 42 is made of an electrically insulating material such as fiber glass. After passage of the flux displacer across the field of the superconducting magnet 14, the flux displacer 70 is braked and recoiled by means of brake 62A. In order to minimize the gap between the superconducting coil 14 and the load coil 20A, and thereby increase the efficiency of the magnetic system, the flux displacer should be as short as possible. For this reason, the flux displacer 70 may be made somewhat oval in shape. The flux displacer 70 should be alightweight, hollow metal shell with internal stiffening means, such as foam plastic 71. The shell should be made of a good electrical conductor, such as aluminum, with a wall thickness sufficient to carry the induced eddy currents with minimum loss. Also, the volume and general outline of the flux displacer should be generally comparable with that of the load coil. For example, if the flux displacer is too long, the transit time becomes unduly long. If the volume is too large, the mass of the flux displacer and the size of the gun barrel is too great. If the volume is too small, only a portion of the external flux threading the load coil 20 will be displaced and the energy output will be unsatisfactory. The oval configuration of the flux displacer as shown in FIG. 7 requires an oval gun barrel 42; however, in some cases, a circular barrel and a round flux displacer can be used.

Figure 10:
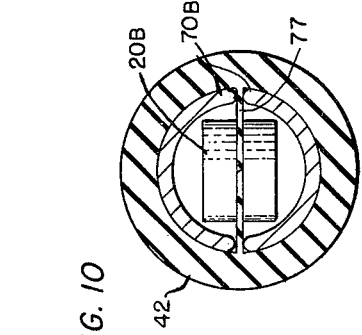
FIG. 10 is an end view of the device shown in FIG. 9.
Figure 9:
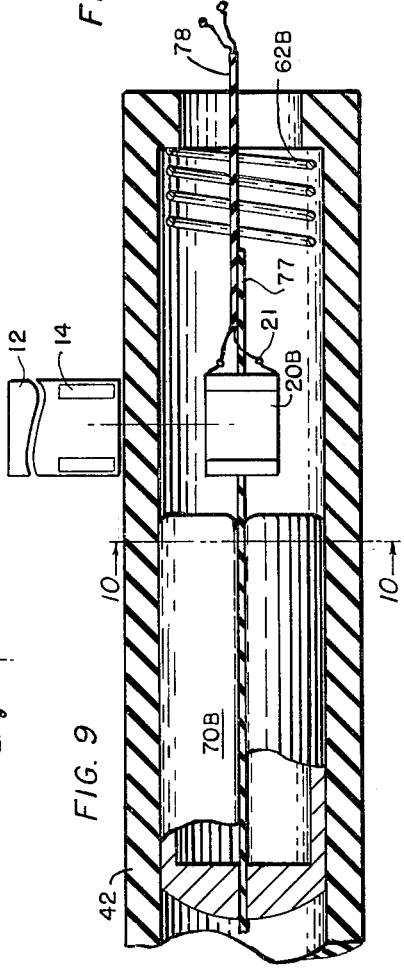
FIG. 9 is a view, partly in cross-section, of a device embodying the principles shown schematically in FIG. 8.

In FIGS. 8 to 10, an arrangement is shown for increasing the efficiency of the magnetic circuit by decreasing the distance or gap between the two magnetic coils 14 and 20B. This is achieved by changing the shape of the flux displacer. As shown in FIGS. 8 and 9, the flux displacer 70A is of generally of U-shaped configuration wherein one leg of the flux displacer passes through the gap between the superconducting magnet 14 and the load coil 20B while the other leg of the flux displacer passes by the other side of the load coil. In effect, then, the two halves of the flux displacer 70A are moved past opposite ends of the load coil. A device for accomplishing the results shown schematically in FIG. 8 is shown in FIGS. 9 and 10, wherein parts similar to those in previous figures are indicated by the same reference numerals. When the power supply switch 58 is closed and the firing coil 56 actuated, the firing pin 55 strikes the percussion cap 54 of shell 52 and the explosive discharge causes motion of the elongated flux displacer 70A or 70B to the right along the barrel 42 of the gun 50. As shown more clearly in FIG. 10, the two legs of the flux displacer are guided along the barrel 42 by a simple guide plate 77 extending along the longitudinal axis of the barrel 42. The guide plate also serves as a support for the fixed load coil 20B which, in this case, is located within the gun barrel itself. A low inductance transmission line 78 may be brought out from the end of the gun barrel and connected to an external load. The flux displacer 70B, during transit, completely surrounds the stationary load coil 20B. If the two requirements for short transit time, previously referred to, are fulfilled, the load coil 20B will be in a practically flux-free region during said transit. Using only the uper portion of flux displacer 70B (somewhat analoguous to a flat plate), would not be nearly as effective as the generally U-shaped displacer 70A shown in FIGS. 8 to 10, which surround the stationary load coil, since the magnetic field lines would be sharply bent around the leading edge of the upper portion of the flux displacer and still penetrate the load coil, even when the flux displacer is disposed between the two coils. In practice, the cryostat 12 may be positioned in contact with the gun barrel 42 and the load coil 20B need be spaced on the inner wall of the gun barrel only by a distance sufficient to allow clearance of the rather thin upper portion 71 of the flux displacer 70A. In this way, the gap between the two magnetic coils is considerable less than that in the case of the device of FIGS. 6 and 7. Braking of the flux displacer 70A may be accomplished by braking means 62B.

What is claimed is:

1. A generator of electrical pulses of high energy and high current comprising magnetic means for providing a magnetic field of high flux and high flux density, a stationary load coil aligned with said magnetic means, a flux displacing member, means for explosively driving only a portion of said flux displacing member between said magnetic means and said load coil at high velocity in response to an actuating impulse for rapidly disrupting the flux introduced into said load coil from said magnetic means to induce electrical energy pulses in said load coil.

2. A generator of electrical pulses as recited in claim 1 wherein said magnetic means is a superconducting magnet.

3. A generator of electrical pulses of high energy and high current comprising magnetic means for providing a magnetic field of high flux and high flux density, a stationary load coil aligned with said magnetic means, a flux displacing member surrounding said load coil, means for explosively driving said displacing member between said magnetic means and said load coil at high velocity in response to an actuating impulse for rapidly disrupting the flux introduced into said load coil from said magnetic means to induce electrical energy pulses in said load coil.

4. A generator of electrical pulses according to claim 3 wherein said magnetic means is a superconducting magnet.

5. A generator of electrical pulses of high energy and high current comprising magnetic means for providing a magnetic field of high flux and high flux density, a stationary load coil aligned with said magnetic means, a hollow lightweight flux displacing member having a thin wall of electrically conducting material, said flux displacer being electrically insulated from said load coil, and means for explosively driving said flux displacing member at high velocity between said magnetic means and said load coil in response to an actuating impulse for rapidly disrupting the flux introduced into said load coil from said magnetic means to induce electrical energy pulses in said load coil, the wall of said member carrying currents induced therein during transit of said flux displacer past said magnetic means which provides a magnetic field opposing the field produced by said magnetic means.

6. A generator of electrical pulses as recited in claim 5 wherein the transit time of said flux displacer past said magnetic means induces electrical pulses of duration shorter than said transit time.

7. A generator of electrical pulses as recited in claim 5 wherein the volume and overall configuration of said flux displacer is comparable with that of said load coil.

References Cited

UNITED STATES PATENTS

| | | | |
|---|---|---|---|
| 2,904,701 | 9/1959 | Colgate | 290—1 |
| 3,024,374 | 3/1962 | Stauder | 310—15 |
| 3,161,793 | 12/1964 | Laithwaite | 290—1 X |
| 3,252,018 | 5/1966 | Drautman | 310—16 |
| 3,257,905 | 6/1966 | Weisman et al. | 310—14 X |
| 3,259,769 | 7/1966 | Stott | 310—14 |
| 3,337,760 | 8/1967 | Allport | 310—13 |
| 3,364,361 | 1/1968 | Burger | 290—1 |

MILTON O. HIRSHFIELD, Primary Examiner

D. F. DUGGAN, Assistant Examiner

U.S. Cl. X.R.

290—1; 310—16